Feb. 18, 1958 P. K. BODGE 2,823,545
MAGNETIC FIELD REACTOR AND SYSTEMS THEREFOR
Filed May 4, 1956 3 Sheets-Sheet 1

Inventor:
Philip K. Bodge
by James E. Wrose
His Attorney

Feb. 18, 1958 P. K. BODGE 2,823,545
MAGNETIC FIELD REACTOR AND SYSTEMS THEREFOR
Filed May 4, 1956 3 Sheets-Sheet 2

Inventor:
Philip K. Bodge
by James E. Whrose
His Attorney

Inventor:
Philip K. Bodge
by James E. Wrose
His Attorney

United States Patent Office 2,823,545
Patented Feb. 18, 1958

2,823,545

MAGNETIC FIELD REACTOR AND SYSTEMS THEREFOR

Philip K. Bodge, Swampscott, Mass., assignor to General Electric Company, a corporation of New York Application May 4, 1956, Serial No. 582,800

17 Claims. (Cl. 74—5.41)

This invention relates to direction sensing devices and, more particularly, to magnetic field reactors which provide positional information in the form of electrical signals, as well as to systems therefor.

It has become common to design direction sensing systems around a magnetic field reactor influenced by the earth's magnetic field and electrically excited by an alternating current signal to produce an output signal characterizing the orientation of the reactor with respect to the earth's field. In the usual form the reactor comprises a magnetically saturable core, the permeability of which is caused to vary periodically according to an alternating excitation current. A principal characteristic of prior devices of this type is that the output signal which characterizes the directional information sought has a frequency twice that of the excitation signal. As a result of this, it has usually been necessary to employ expensive winding techniques in the reactor itself to reduce the level of add harmonic signals in the output, and the electrical system employing the reactor as a sensing element is generally burdened and complicated by frequency multiplying or dividing circuits in order to enable it to utilize the second harmonic output signal obtained from the reactor.

Some magnetic field reactors have in the past been proposed which produce a fundamental frequency output signal, but such devices as have been proposed characteristically require moving parts for their operation with the usual attendant consequences of wear and decreased sensitivity.

It is an object of this invention to provide an improved electrically excited magnetic field reactor having no relatively movable parts and capable of producing position characterizing output signals having the same frequency as the excitation current.

Another object of this invention is to provide an improved electrically energized direction sensing system (for dirigible craft) having simplified circuitry requiring neither frequency multiplying nor frequency dividing circuits.

By way of a brief summary of but one aspect of this invention, there is provided on the annular magnetically permeable core of an earth's field reactor a set of toroidally wound selsyn-type position-phase windings. On the central axis of the annular core a short cylinder of medium permeability material supports at either end a series of radially aligned saturable vanes which extend into the vicinity of the annular core, sandwiching the core between their extremities. In a preferred form a direct current solenoid on the cylindrical element magnetically polarizes the vanes on one end to have a polarity opposite to that of the vanes on the other end, and maintains the flux density in the vanes at or near saturation. A second solenoid on the cylindrical element may be used either to excite the reactor with alternating magnetic fluxes in one mode of operation, or, in another mode, to derive positional signals therefrom. Such a construction requires no moving parts and enables the generation of output signals having the same frequency as that of the excitation signals.

Although the scope of this invention is not to be limited, except by fair interpretation of the appended claims, the details of this invention, as well as further objects and advantages, may perhaps be better understood in connection with the accompanying drawings wherein:

Figure 5:
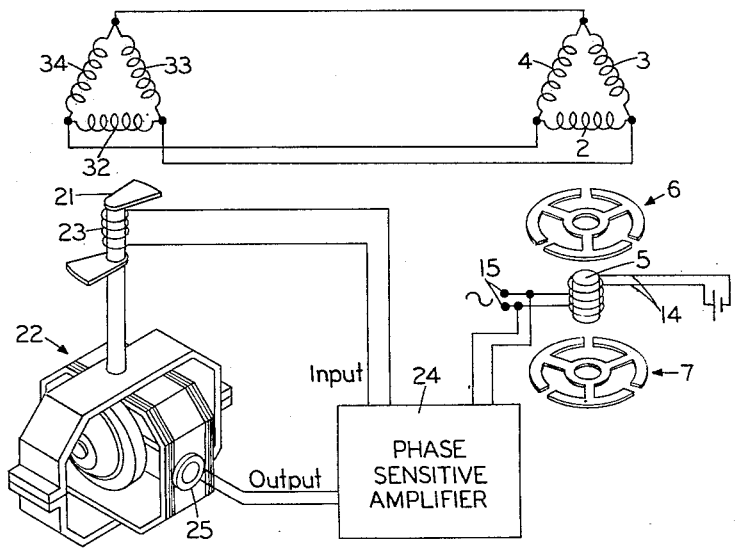
Figure 6:
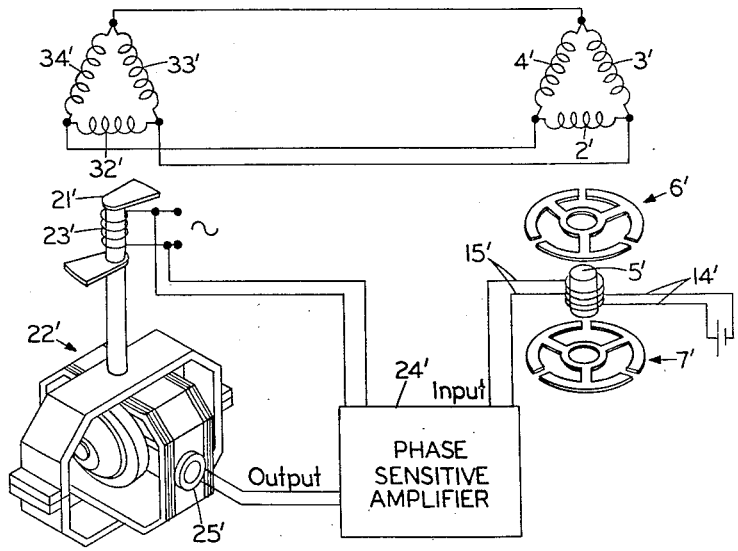

Figure 5 is a diagrammatic representation of an improved direction sensing system constructed in accordance with the principles of this invention and illustrating one mode of operation of the improved magnetic field reactor; and Figure 6 is a diagrammatic representation of an improved direction sensing system constructed in accordance with the principles of this invention and illustrating another mode of operation of the improved magnetic field reactor.

Figure 1:
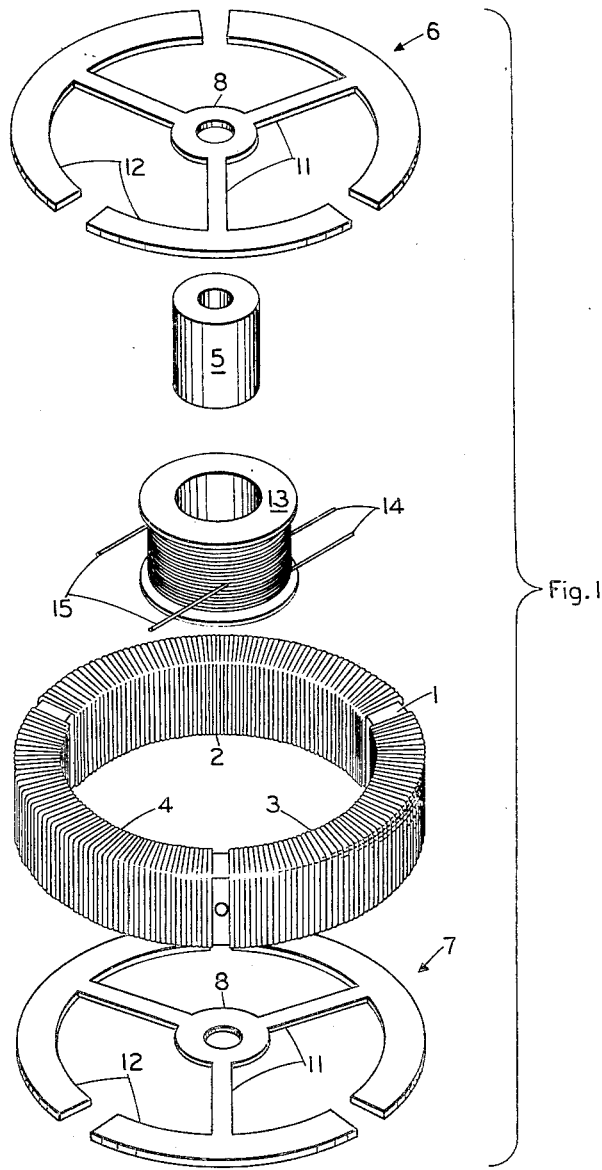
Figure 1 represents an exploded pictorial view of an improved magnetic field reactor constructed in accordance with the principles of this invention.
Figure 2:
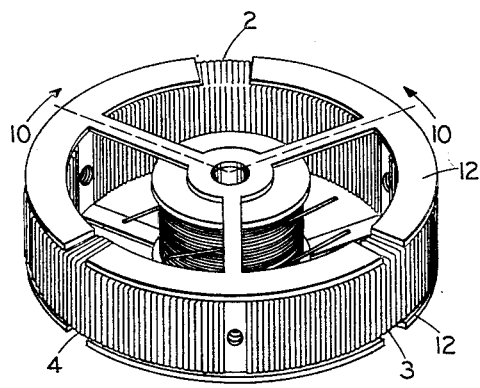
Figure 2 represents an assembled pictorial view of the reactor illustrated in Figure 1.
Figure 3:
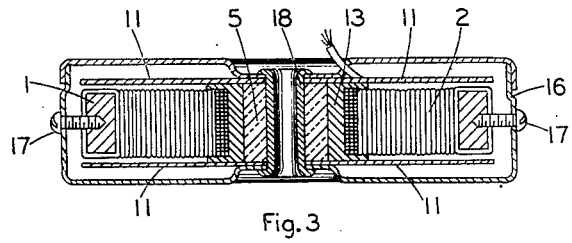
Figure 3 is a cross-sectional view taken on the lines 10—10 of Figure 2 showing the reactor mounted in a support structure.

The magnetic field reactor illustrated in Figures 1 to 3 comprises an annular magnetically permeable core 1, preferably formed of a material having a fairly high saturation flux density such as silicon steel. Toroidally wound on core 1 are position-phase windings 2, 3 and 4 which may be connected in wye or delta in accordance with the usual practice. A cylindrical flux conducting core 5, preferably composed of a medium permeability material, such as nicoloi, is positioned on the central axis of annular core 1 and has attached to either end flux conducting members 6 and 7 which are formed symmetrically, with the central portion 8 attached to the cylindrical core and which have radiating therefrom saturable vanes 11 terminating in flux collectors 12. Concentrically situated about cylindrical core 5 coil form 13 supports two separate windings terminating respectively in terminals 14 and 15. The entire structure may be enclosed within a suitable container 16 and the parts thereof maintained in their relative positions by fastening elements such as screws 17 and hollow rivet 18.

Terminals 14 of one of the windings on winding form 13 are energized by a direct current such that the vanes 11 at one terminus of cylindrical core 5 are maintained at a single magnetic polarity which is opposite from that resulting in the vanes 11 at its other terminus, and the strength of the direct current is adjusted to such a level that each of the vanes 11 is maintained at or near its saturation flux density.

To illustrate the operation of the foregoing magnetic field reactor, let us suppose that the reactor is suspended in the earth's magnetic field as illustrated by parallel lines 21. If each of the vanes at the top of cylindrical core 5 has had induced in it a south-seeking polarity as a result of the direct current applied to the direct current winding, the earth's magnetic field will have the effect, by opposing the induced flux in vanes 11a and 11b on the top north side of the reactor, of increasing the permeability of the vanes. At the same time, the permeability of vane 11c on the top south side will be reduced because the earth's field will aid the induced flux therein. The situation with regard to the vanes on the bottom of the reactor will be exactly reversed from the status of those on the top. Since all the bottom vanes will have a north-seeking polarity, vanes 11d and 11e on the bottom north side will have their permeability reduced and the remaining bottom vane will have an increased permeability because of the substractive effects between the induced flux and the earth's magnetic field.

Figure 4:
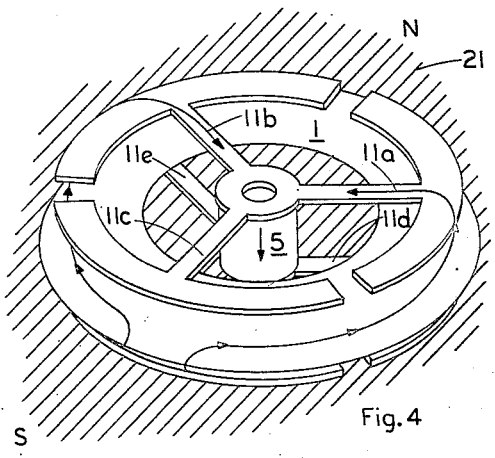
Figure 4 is a diagrammatic representation of the reactor shown in Figures 1 to 3 as it is influenced by an external magnetic field.

Now, in one mode of operation, the second winding on cylindrical flux conducting element 5 is excited by alternating current of a given frequency. Because of the differences in permeability of the flux vanes brought about by the coaction of the earth's field with the polarities and configurations of the reactor just described, an effective path for the alternating magnetic fluxes induced in element 5 will follow the arrows of Figure 4. Thus, at one instant an alternating flux component will descend through flux conducting element 5 to the bottom south vane; after passing through this vane, the flux will divide, traversing opposite sides of annular core 1 until it comes in the neighborhood of vanes 11a and 11b. Passing through these vanes the divided flux components will again merge and descend through cylindrical element 5. In the next phase reversal of the alternating excitation current, the directions of the flux arrows will reverse but the flux paths will remain the same. It can be seen that the position-phase windings 2, 3 and 4 located on different portions of core 1 will intercept different amounts of alternating flux and that a pattern of signals will result in these windings having phases and amplitudes related to the orientation of the reactor within the external magnetic field. Effectively, then, this arrangement can be described as functioning in the manner of a well-known Z-vane telemetering unit in which the Z-vane is always oriented in a north-south direction, for as long as saturable vanes 11 are magnetically biased as described, the reactor will present a Z-shaped flux path of increased permeability in which alternating fluxes may circulate.

This feature is in marked distinction with other magnetic field reactors wherein the core structure is, through periodic saturation, caused to intercept varying amounts of the external magnetic field. In such prior devices, since saturation occurs twice during each cycle of excitation current, the output signal is necessarily of a second harmonic nature. In a reactor constructed in accordance with this invention, however, such saturation effects as are utilized are made to determine an effective path for fundamental frequency alternating fluxes. The result therefore is to produce a fundamental frequency output signal characterizing the positional information sought. Although harmonic signals may appear in the output circuit, these are not used to characterize positional information and may easily be filtered out if desired.

In Figure 5 a direction sensing arrangement is illustrated utilizing the magnetic field reactor constructed in accordance with this invention in one of its modes of operation. With the reactor suspended in the earth's magnetic field, and the cylindrical core energized with alternating magnetic fluxes, fundamental frequency output signals appear across position phase windings 2, 3 and 4. These signals, by virtue of the synchro connections illustrated are repeated across windings 32, 33 and 34 of a conventional Z-vane signal pickoff. Z-vane 21 is mounted to rotate in azimuth with the major axis gimbal of directional gyro 22. When the Z-vane is not 90° out of correspondence with the pattern of signals in windings 32, 33, and 34 resulting from the earth's magnetic field, it will be apparent to those skilled in the art to which this invention pertains, that an output signal will be induced in winding 23. This output signal will have a phase relationship with respect to the signal applied at 15 depending on whether the orientation of the Z-vane is left of null or right of null position, and may be fed into a phase sensitive amplifier 24 which may be powered from the same source that applies the alternating current signal to winding 15. The amplifier in turn applies a correcting signal to torque motor 25 which will force the gyro to precess in one or the other direction about its vertical axis until the Z-vane 21 is in its null position. Movement in azimuth of a craft on which this system is mounted will cause the gyro rotor structure to assume various orientations which the Z-vane will follow, thus moving to different positions with respect to windings 32, 33 and 34; however, simultaneously with this movement, the signal pattern resulting in windings 2, 3, and 4 from the action of the earth's magnetic field will vary and correspondence between the two will result. It is to be noted that the magnetic field reactor has no moving parts and does not require to be driven into different orientations upon movement of the craft in azimuth. If desired, an appropriate amplifier may be inserted between the two sets of position-phase windings shown without in any way departing from these teachings, and other pickoff arrangements may be used than the Z-vane shown.

In Figure 6 where the same reference numbers are used to designate identical parts, essentially the same direction sensing arrangement as that illustrated in Figure 5 is shown with one variation which alters the mode of operation of the magnetic field reactor. Here an alternating current excitation signal is applied instead to winding 23' of Z-vane 21'. As a result of the alternating magnetic fluxes induced therein, Z-vane 21' will occasion a pattern of fundamental frequency alternating current signals to appear in windings 32', 33' and 34', which because of the synchro connections illustrated will be repeated in windings 2', 3', and 4' of the magnetic field reactor. In this case it can be seen that the interaction between the position-phase signals of windings 2', 3' and 4' and the earth's magnetic field will give rise to a pattern of fluxes in the various flux conducting members of the reactor similar to that produced in the first mode of operation described in connection with Figure 4. The output signal, however, instead of appearing across windings 2', 3' and 4' in the form of a synchro-type signal, will, because of the alternating fluxes in cylindrical core 5', appear at terminals 15'. This output signal is phase characterized in the same way as the output of the Z-vane repeater in Figure 5, and may be utilized in the same manner to slave the directional gyro to a given azimuthal orientation. Hence, when the pattern of signals repeated in windings 2', 3' and 4' has an effective diameter across the reactor which is at 90° to the direction of the earth's magnetic field, no signal will appear at terminals 15'. At all other diameters, however, a phase-characterized signal will appear at 15' which, when amplified, may be used to control torque motor 25', thus slaving directional gyro 22' to the earth's magnetic field.

It will, therefore, be appreciated that one and the same construction of this improved magnetic field reactor will permit different modes of operation such that the functions of the solenoidal alternating current winding and the position phase windings may be reversed, each being capable of acting either as an excitation winding or an output winding.

Although there have been shown and described certain specific embodiments of this invention, it will occur to those skilled in the art to which the invention pertains that other arrangements may be constructed within the compass of these teachings and that numerous changes, modifications, and substitutions may be made without departing either in spirit or in scope from this invention in its broader aspects. For example, it will be recognized that the position-phase windings need not be three-phase but can be constructed in any known manner to provide position-characterizing information. In yet another modification, a single solenoidal winding on cylindrical core 5 could, by means of suitable external circuitry, carry both direct and alternating currents, thus performing the functions of both windings illustrated. It is likewise not essential that there be but three saturable vanes at each end of the cylindrical flux conducting element, but that a greater number is permissible and, with two-phase position-phase windings, as few as two may be used.

It should therefore be apparent that the above embodiments are illustrative in nature and should not be taken to limit the true scope of this invention in its broader aspects.

What I claim as new and desire to secure by Letters Patent of the United States is:

1. A magnetic field reactor for generating electrical signals characterizing positional information with respect to an external unidirectional magnetic field comprising: magnetically biased flux conducting means having a configuration such that said external field acts thereon to vary the permeability thereof along paths determined by the orientation of said flux conducting means in said field; means for producing a periodically varying magnetic flux circulating through said flux conducting means along paths determined by the orientation of said flux conducting means in said field; inductive means for deriving from said periodically varying magnetic flux electrical signals characterizing positional information.

2. A magnetic field reactor for generating electrical signals characterizing positional information with respect to an external unidirectional magnetic field comprising: magnetically biased flux conducting means having a configuration such that said external field acts thereon to increase the permeability thereof at certain selected portions and to decrease the permeability thereof at other selected portions determined by the orientation of said flux conducting means in said field; means for producing a periodically varying magnetic flux circulating through said flux conducting means along paths including said selected portions wherein the permeability has been increased by the action of the external field; inductive means for deriving from said periodically varying magnetic flux electrical signals characterizing positional information.

3. A magnetic field reactor for generating electrical signals characterizing positional information with respect to an external magnetic field comprising: a magnetically permeable core structure; magnetically biased flux conducting means fixedly mounted in proximity to said core structure and having a configuration such that said external field acts upon said flux conducting means to vary the permeability thereof along paths determined by the orientation of said reactor within said external field; means for producing a periodically varying magnetic flux circulating through said core structure and said flux conducting means along paths determined by the orientation of said reactor in said external field; inductive means for deriving from said periodically varying magnetc flux electrical signals characterizing positional information.

4. A magnetic field reactor for generating electrical signals characterizing positional information with respect to an external unidirectional magnetic field comprising: a magnetically permeable core structure defining a closed flux path about a central axis; flux conducting means disposed along lines intersecting said central axis; means for magnetically biasing said flux conducting means such that said external field acts upon said flux conducting means to vary the permeability thereof along paths determined by the orientation of said reactor in said external field; means for producing a periodically varying magnetic flux circulating through said core and said flux conducting means along paths determined by the orientation of said reactor in said external field; inductive means for deriving from said periodically varying magnetic flux electrical signals characterizing positional information.

5. A magnetic field reactor for generating electrical signals characterizing positional information with respect to an external magnetic field comprising: a magnetically permeable core structure; magnetically saturable flux conducting means fixedly mounted in proximity to said core structure; means for magnetically biasing said flux conducting means such that selected portions thereof are maintained near saturation; said flux conducting means having a configuration such that said external field acts thereon to relieve said saturation in certain of said selected portions determined by the orientation of said reactor within said external field; means for producing a periodically varying magnetic flux circulating through said core structure and said flux conducting means along paths including the selected portions of said flux conducting means wherein saturation has been relieved; and inductive means for deriving from said periodically varying magnetic flux position-characterizing electrical signals.

6. A magnetic field reactor for generating electrical signals characterizing positional information with respect to an external unidirectional magnetic field comprising: first magnetically saturable core means comprising a plurality of co-planar radially arranged flux conducting vanes extending from a common center; second magnetically saturable core means substantially identical to said first core means; magnetically polarized flux conducting means joining the centers of said core means and maintaining them in spaced-apart relationship; a magnetically permeable core structure defining a closed flux path concentric with said flux conducting means and lying between the vanes of said first core means and the vanes of said second core means; position phase electrical winding arranged on said core structure; and periodically varying current, induction means arranged for inductive coaction with said flux conducting means.

7. In a magnetic field reactor for generating electrical signals characterizing positional information with respect to an external unidirectional magnetic field, the combination of elements comprising: first magnetically saturable core means comprising a plurality of co-planar radially arranged flux conducting vanes extending from a common center; second magnetically saturable core means substantially identical to said first core means; magnetically polarized flux conducting means joining the centers of said core means and maintaining them in spaced-apart relationship; a magnetically permeable core structure defining a closed flux path concentric with said flux conducting means and lying between the vanes of said first core means and the vanes of said second core means; position phase electrical winding arranged on said core structure; and periodically varying current induction means arranged for inductive coaction with said flux conducting means.

8. A magnetic field detector for generating electrical signals characterizing position information with respect to an external unidirectional magnetic field comprising: an annular magnetically permeable core structure encircling a central axis; position-phase electrical windings symmetrically arranged on said core structure; a pair of magnetically saturable members positioned parallel to and on opposite sides of said core structure, each member comprising a plurality of substantially coplanar vanes radially disposed about a common center on said central axis; magnetically polarized flux conducting means disposed on said axis and joining the centers of said members such that all the vanes of one member have a single magnetic polarity opposite to that of the vanes of the other member; and periodically varying current induction means arranged for inductive coaction with said flux conducting means.

9. An electrically excited telemetering unit to be operated in conjunction with an external unidirectional magnetic field comprising: a magnetically permeable core structure defining a closed path about a central axis; position-phase electrical winding means symmetrically arranged on said core structure; a flux conducting magnetically polarized element of magnetically permeable material positioned on said central axis and having axially spaced end portions; a plurality of magnetically saturable vanes positioned at each end of said cylindrical element and radiating symmetrically therefrom to positions in close proximity to said core structure; whereby the vanes at one end of said element have a magnetic polarity opposite to that of the vanes at the other end of said element; and periodically varying current coil means in inductive relationship with said flux conducting element.

10. A magnetic field reactor for generating electrical signals characterizing the orientation of said reactor within an external unidirectional magnetic field comprising: a magnetically permeable core structure defining a closed flux path about a central axis; flux conducting means disposed along lines intersecting said central axis; means for magnetically biasing said flux conducting means such that said external field acts upon said flux conducting means to vary the permeability thereof along paths determined by the orientation of said reactor in said external field; inductive means for producing a periodically varying magnetic flux circulating through said core and said flux conducting means along paths determined by the orientation of said reactor in said external field; position-phase winding means for deriving from said periodically varying magnetic flux electrical signals characterizing the orientation of said reactor within said external field.

11. A magnetic field reactor for generating electrical signals characterizing positional information with respect to an external unidirectional magnetic field comprising: a magnetically permeable core structure defining a closed flux path about a central axis; flux conducting means disposed along lines intersecting said central axis; means for magnetically biasing said flux conducting means such that said external field acts upon said flux conducting means to vary the permeability thereof along paths determined by the orientation of said reactor in said external field; position-phase winding means for producing a periodically varying magnetic flux circulating through said core and said flux conducting means along paths determined by the orientation of said reactor in said external field; inductive means for deriving from said periodically varying magnetic flux electrical signals characterizing positional information.

12. A magnetic field reactor for generating electrical signals characteristic of the orientation of said reactor within an external unidirectional magnetic field comprising: an annular core of magnetically permeable material; position-phase electrical winding means symmetrically arranged on said core; a cylindrical element of magnetically permeable material coaxially positioned with respect to said annual core and magnetically polarized along its axis; a plurality of magnetically saturable vanes positioned at each end of said cylindrical element and radiating symmetrically therefrom to positions in close proximity to said core and winding means; a solenoidal electrical winding coaxially spaced about said cylindrical element; means for energizing said solenoidal winding with a periodically varying electrical current; means for deriving from said position-phase winding means electrical signals characteristic of the orientation of said reactor within said external magnetic field.

13. A magnetic field reactor for generating electrical signals characterizing positional information with respect to an external unidirectional magnetic field comprising: an annular core of magnetically permeable material; position-phase electrical winding means symmetrically arranged on said core; a cylindrical element of magnetically permeable material coaxially positioned with respect to said annular core and magnetically polarized along its axis; a plurality of magnetically saturable vanes positioned at each end of said cylindrical element and radiating symmetrically therefrom to positions in close proximity to said core and winding means; a solenoidal electrical winding coaxially spaced about said cylindrical element; means for energizing said position-phase winding means with electrical signals characterizing positional information with regard to a remotely located unit; and means for deriving from said solenoidal winding a periodically varying electrical current characterizing positional information with respect to said external field.

14. A magnetic field detector for generating electrical signals characterizing the orientation of said detector within an external unidirectional magnetic field comprising: a magnetically permeable core structure defining a closed flux path about a central axis; flux conducting means disposed along lines intersecting said central axis; means for magnetically biasing said flux conducting means such that said external field acts upon said flux conducting means to vary the permeability thereof along paths determined by the orientation of said detector in said external field; electrical excitation winding means in inductive relationship with said flux conducting means for inducing in said core and said flux conducting means a periodically varying magnetic flux circulating along paths determined by the orientation of said detector in said external field; and position phase windings on said core structure for deriving from said periodically varying magnetic flux electrical signals characterizing positional information.

15. A magnetic field detector for generating electrical signals characterizing positional information with respect to an external unidirectional magnetic field comprising: a magnetically permeable core structure defining a closed flux path about a central axis; flux conducting means disposed along lines intersecting said central axis; means for magnetically biasing said flux conducting means such that said external field acts upon said flux conducting means to vary the permeability thereof along paths determined by the orientation of said detector in said external field; position phase windings on said core structure for receiving position-phase signals from a remote position telemetering unit and inducing in said core and said flux conducting means a periodically varying magnetic flux circulating along paths determined by the orientation of said detector in said external field; and electrical winding means in inductive relationship with said flux conducting means for deriving from said periodically varying magnetic flux electrical signals characterizing positional information.

16. A gyromagnetic compass system for dirigible craft comprising: a directional gyro; precessing means for changing the azimuthal orientation of said gyro, a position telemetering unit comprising a first position phase electrical coil arrangement, a flux conducting rotor rotatable in close proximity to said coil arrangement in accordance with the azimuthal orientation of said gyro, and first electrical winding means in inductive relationship with said rotor; a magnetic field detector fixed to rotate in azimuth with said craft for generating electrical signals characterizing the orientation of said craft in the earth's magnetic field including a second position phase electrical coil arrangement electrically connected to said first coil arrangement such that similar electrical currents flow in each such arrangement, flux conducting means fixed in relation to said second coil arrangement, means for magnetically biasing said flux conducting means such that the earth's magnetic field acts thereon to vary the permeability thereof along paths determined by the orientation of said detector and craft in the earth's magnetic field, and second electrical winding means in inductive relationship with said flux conducting means; means for applying a periodically varying fundamental frequency excitation current to one of said electrical winding means; phase sensitive amplifier means for receiving from the other of said winding means a periodically varying fundamental frequency output current; and means for applying a control signal from said amplifier to said precessing means to control the azimuthal orientation of said gyro.

17. A direction sensing system for dirigible craft comprising: an inertia-stabilized device movable in azimuth with respect to said craft for providing an azimuthal reference; means for changing the azimuthal orientation of said device; an electromagnetic position telemetering unit comprising first position-phase windings, and first induction means inductively coupled with said first position-phase windings for varying degrees of coaction depending on the azimuthal orientation of said inertia-stabilized device; a magnetic field reactor fixed to move in azimuth with said craft for generating electrical signals characterizing positional information with respect to the earth's magnetic field comprising magnetically biased flux conducting means having a configuration such that the earth's field acts thereon to increase the permeability thereof at certain selected portions and to decrease the permeability thereof at other selected portions determined by the orientation of said reactor and said craft in the earth's magnetic field, second position-phase windings synchronously connected with said first position-phase windings and inductively coupled with said flux conducting means; and second induction means inductively coupled with said flux conducting means; means for energizing one of said induction means with periodically varying electrical currents, whereby a periodically varying magnetic flux is caused to circulate in said flux conducting means along paths including said selected portions wherein the permeability has been increased by the action of the earth's magnetic field; phase sensitive amplifier means for deriving from the other of said induction means a periodically varying output current; and means for applying a control signal from said amplifier to said orientation changing means to control the azimuthal orientation of said inertia-stabilized device.

References Cited in the file of this patent

UNITED STATES PATENTS

| | | |
|---|---|---|
| 2,391,442 | Beach | Dec. 25, 1945 |
| 2,451,230 | Lundberg | Oct. 12, 1948 |